US012006863B1

(12) United States Patent
Rezmerita

(10) Patent No.: US 12,006,863 B1
(45) Date of Patent: Jun. 11, 2024

(54) ROTARY ENGINE

(71) Applicant: Mihail A. Rezmerita, Knoxville, TN (US)

(72) Inventor: Mihail A. Rezmerita, Knoxville, TN (US)

( * ) Notice: Subject to any disclaimer, the term of this patent is extended or adjusted under 35 U.S.C. 154(b) by 0 days.

(21) Appl. No.: 18/408,876

(22) Filed: Jan. 10, 2024

Related U.S. Application Data

(60) Provisional application No. 63/587,870, filed on Oct. 4, 2023.

(51) Int. Cl.
*F01C 1/08* (2006.01)
*F01C 19/08* (2006.01)
*F02B 53/10* (2006.01)
*F02B 53/12* (2006.01)
*F02B 55/08* (2006.01)

(52) U.S. Cl.
CPC .............. *F02B 55/08* (2013.01); *F01C 1/084* (2013.01); *F01C 19/08* (2013.01); *F02B 53/10* (2013.01); *F02B 53/12* (2013.01)

(58) Field of Classification Search
CPC .... F01C 1/22; F01C 1/10; F01C 1/077; F01C 1/084; F01C 1/104; F01C 1/103
See application file for complete search history.

(56) References Cited

U.S. PATENT DOCUMENTS

2023/0243295 A1* 8/2023 Klassen .................. F01C 1/103 123/320

FOREIGN PATENT DOCUMENTS

KR 101639390 B1 * 7/2016
WO WO-02063151 A1 * 8/2002 .............. F01C 1/084
WO WO-2007124587 A1 * 11/2007 .............. F01C 1/084

* cited by examiner

*Primary Examiner* — Ngoc T Nguyen
(74) *Attorney, Agent, or Firm* — TechnicalAttorney; Rick Barnes

(57) ABSTRACT

A rotary internal combustion engine having a cover plate, and stator plate having a bore with teeth and a primary cog that is larger than the teeth. A main rotor having a partially-circular cut-out. A gear rotor is disposed within the cut-out, having teeth that engage the teeth of the stator ring. A base plate has inlet ports for receiving fuel, air, and spark, where an ignition of the fuel and air by the spark creates a high pressure zone that drives the main rotor and the gear rotor rotationally within the stator ring, and an outlet port for exhausting spent fuel and air.

6 Claims, 7 Drawing Sheets

Fig. 1A
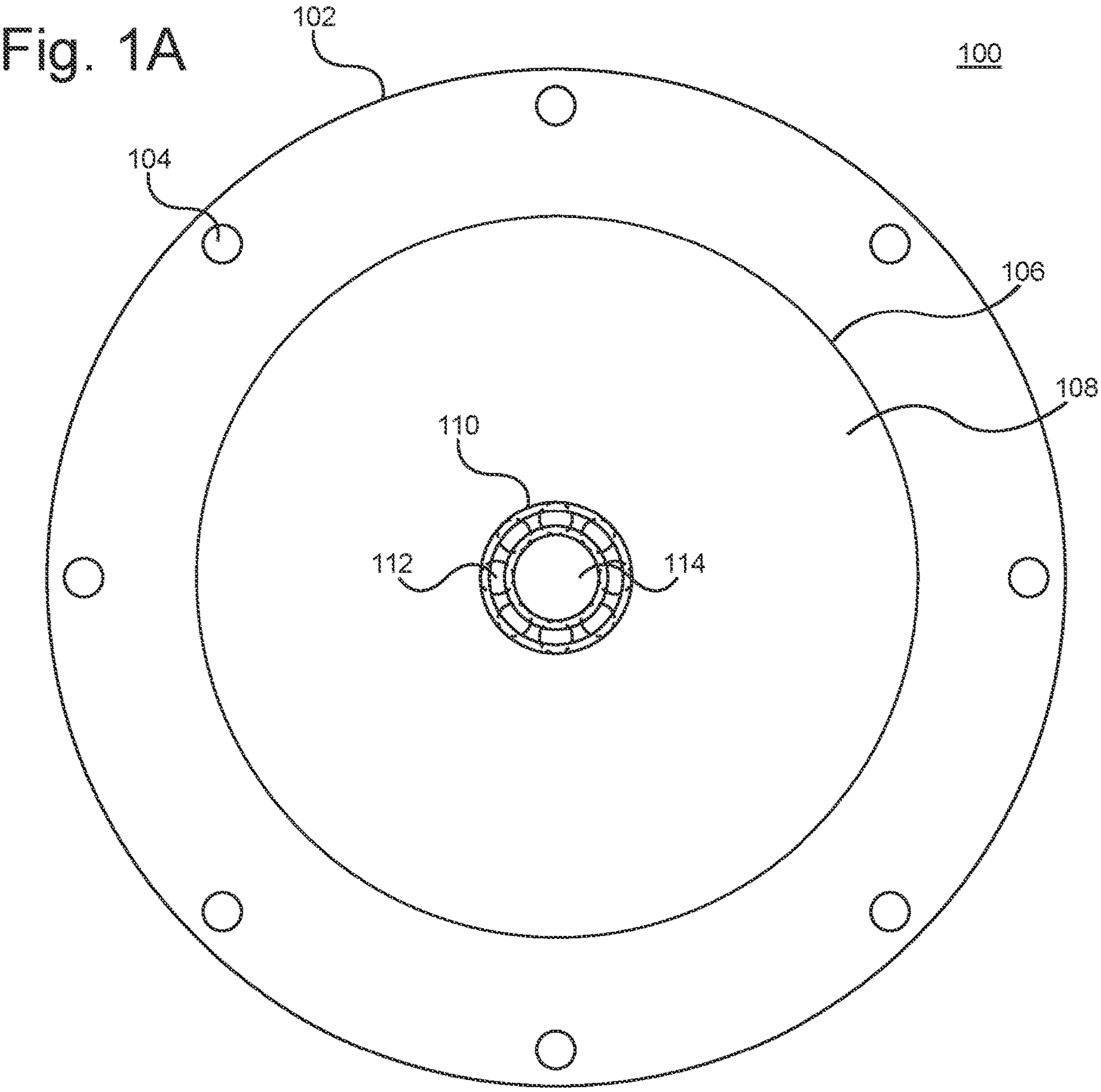
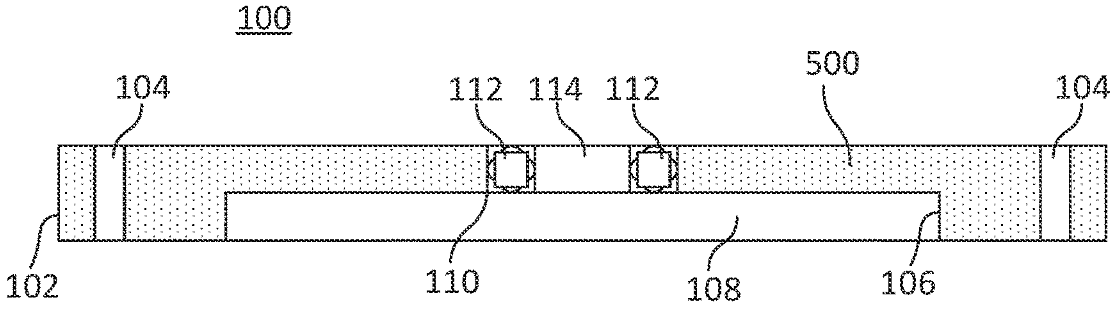
Fig. 1B

Fig. 2A
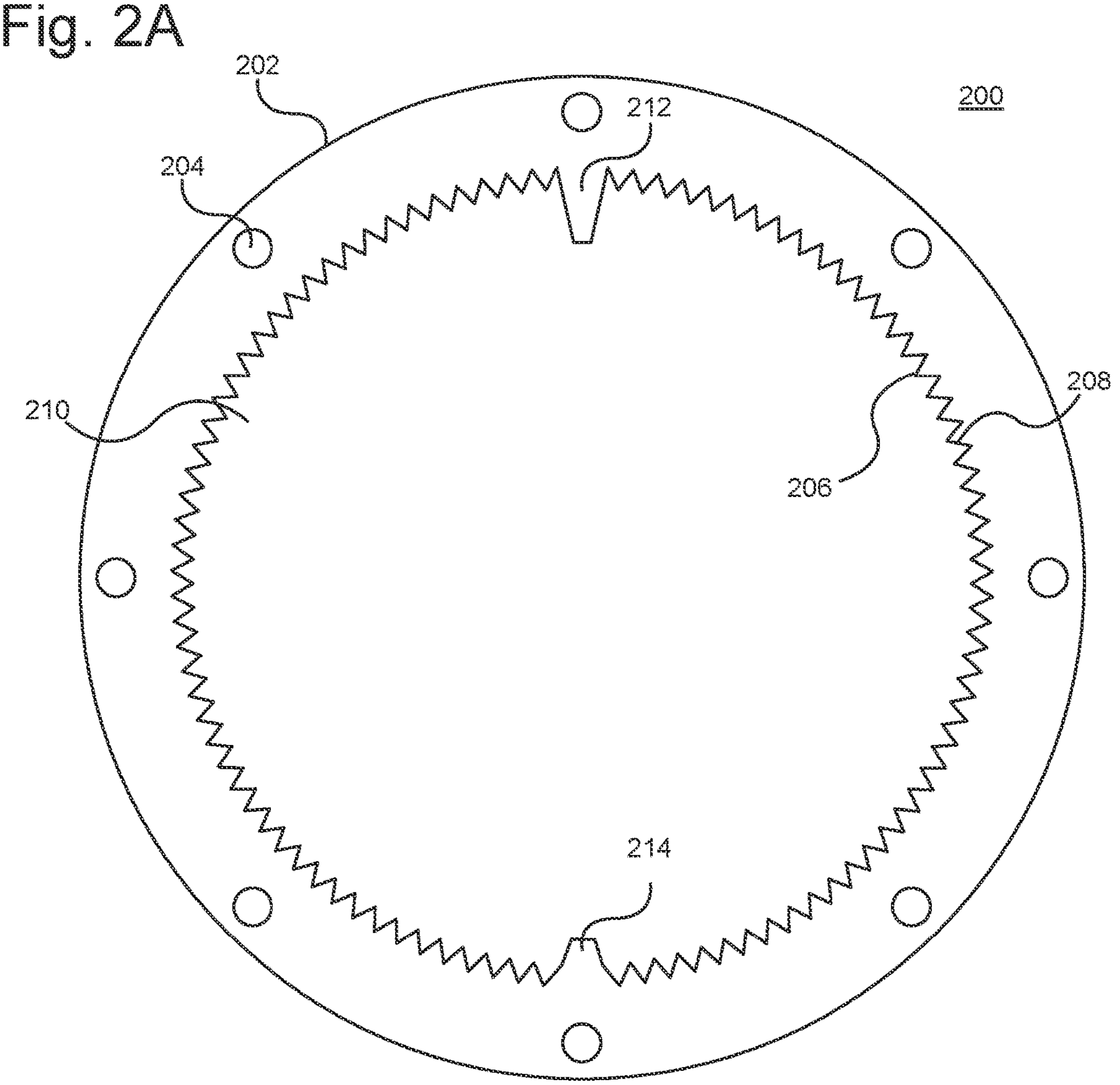
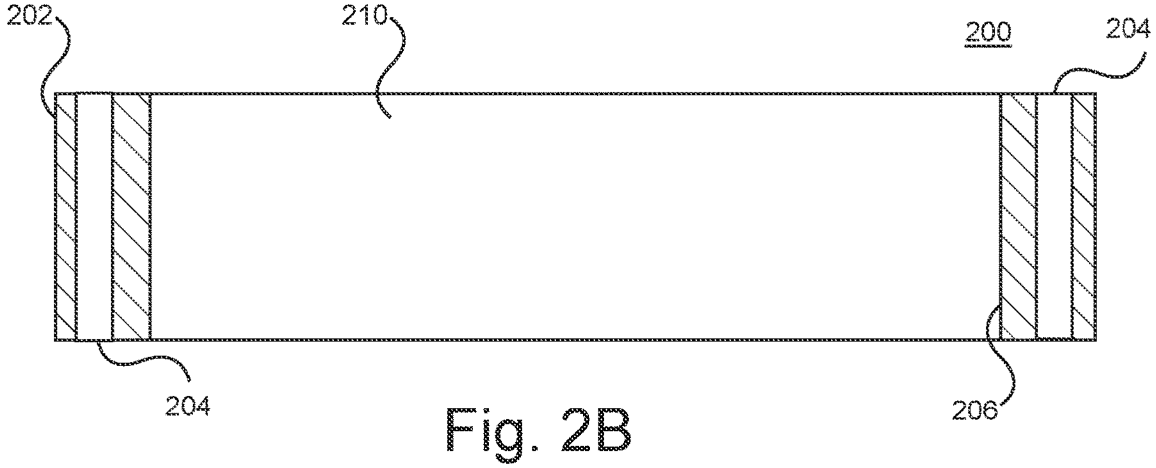
Fig. 2B

Fig. 3A
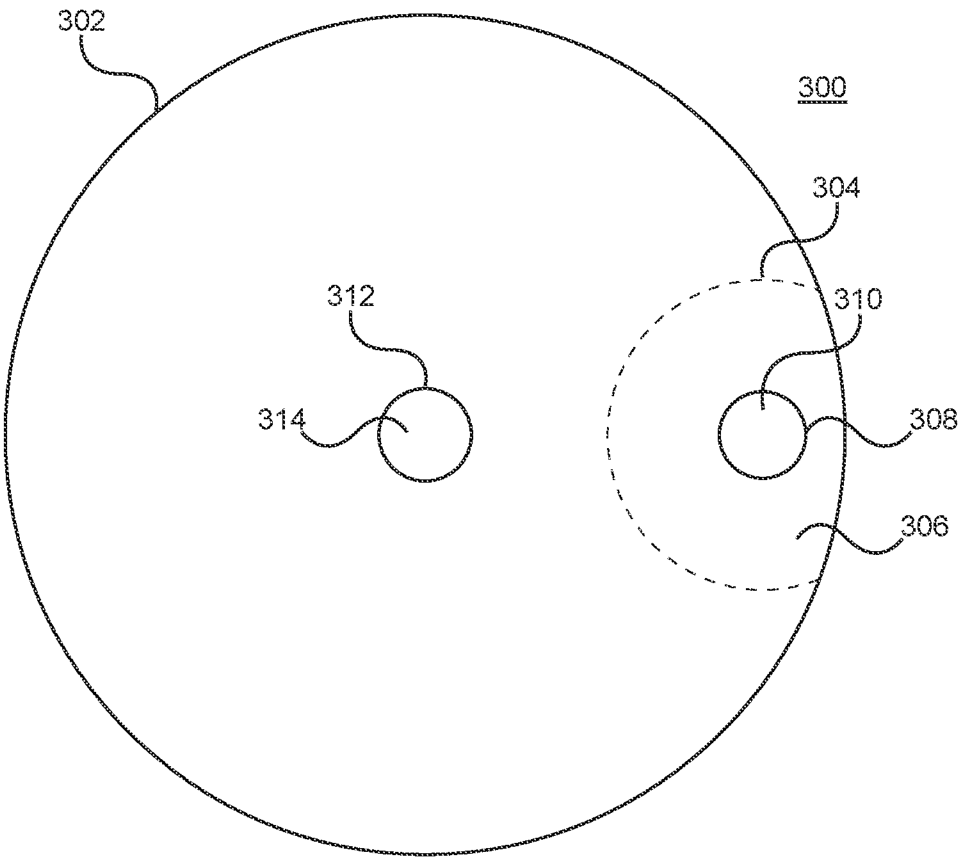
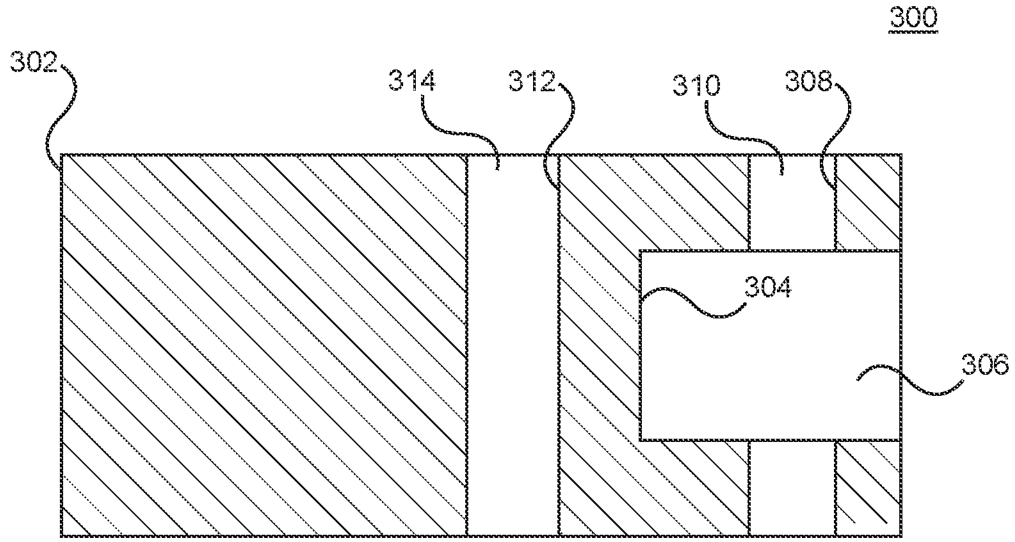
Fig. 3B

Fig. 5A
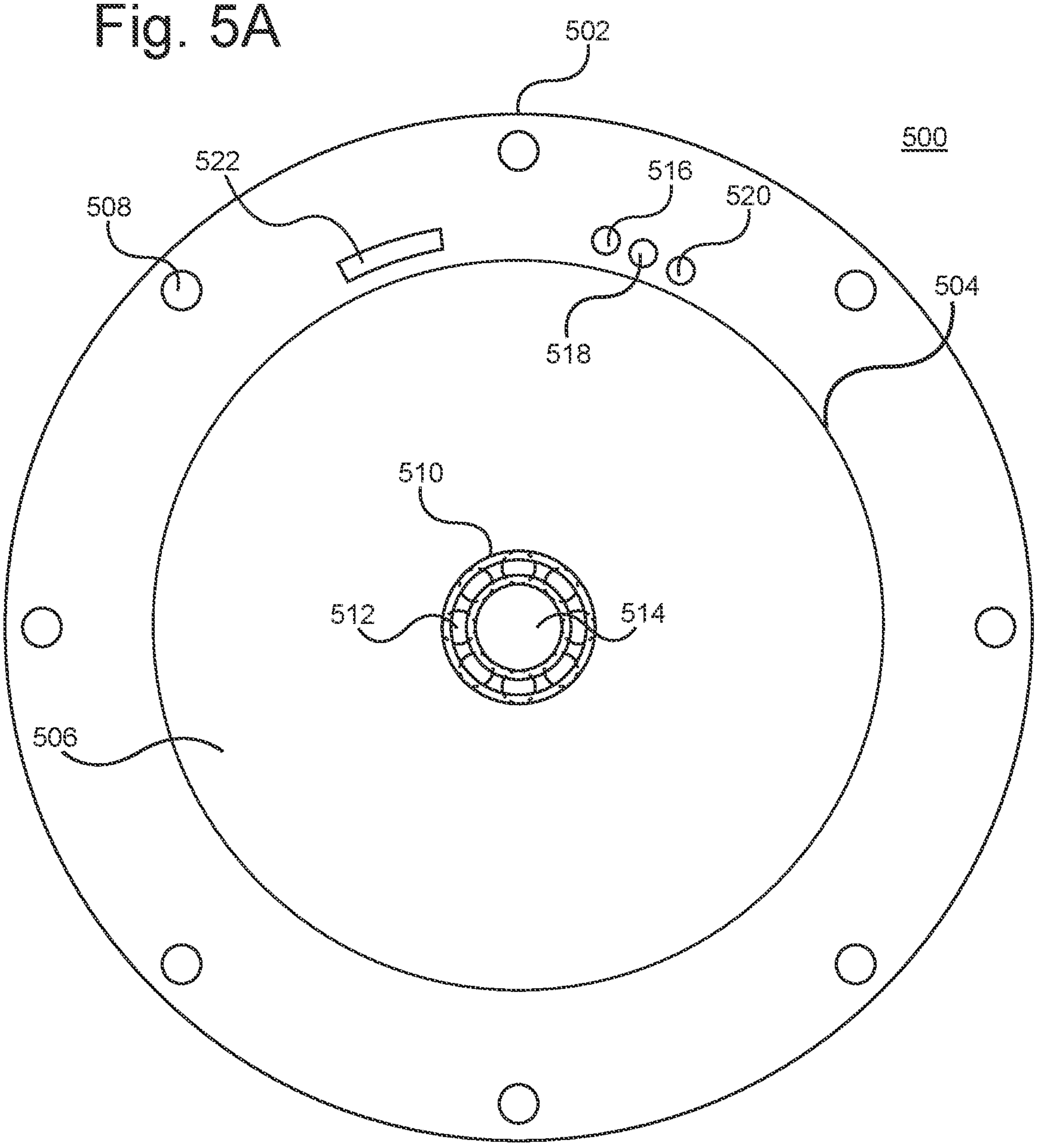
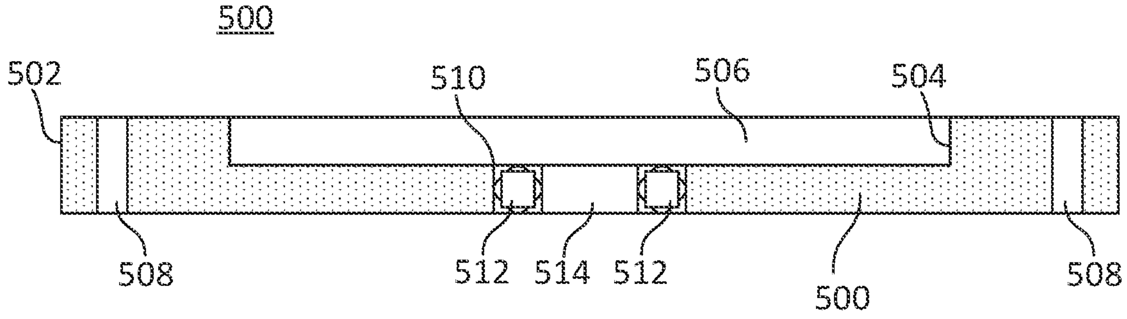
Fig. 5B

ROTARY ENGINE

PRIORITY

This application claims priority on prior U.S. provisional patent application Ser. No. 63/587,870 filed 2023 Oct. 4, the entirety of the disclosure of which is incorporated herein by reference.

FIELD

This invention relates to the field of internal combustion engines. More particularly, this invention relates to a rotary internal combustion engine.

INTRODUCTION

Internal combustion engines (ICEs) tend to be extremely complex, with many different moving parts. This tends to make an ICE difficult to maintain. What is needed, therefore, is an ICE that tends to reduce issues such as this, at least in part.

SUMMARY

The above and other needs are met by a rotary internal combustion engine (ICE) having a cover plate with an outer edge, a medial edge, and an inner edge, where the portion between the outer edge and the medial edge is a raised portion, and the portion between the medial edge and the inner edge is a thinner portion. The inner edge defines a bore through the cover plate. A stator plate includes an outer edge and an inner edge, where the inner edge defines a bore, where teeth are formed along the inner edge, and a primary cog is disposed in a position along the inner edge. The primary cog is larger than the teeth. A main rotor includes an outer edge, an inner edge that defines a bore, and a medial edge that forms a partially-circular cut-out in the main rotor. The cut-out does not extend to either a top or bottom surface of the main rotor, but does extend outwards to the outer edge of the main rotor. A gear rotor is disposed within the partially-circular cut-out in the main rotor, having an outer edge, and an inner edge that defines a bore. The outer edge includes teeth that are sized to engage the teeth of the stator ring. A base plate includes an outer edge, a medial edge, and an inner edge, where the portion between the outer edge and the medial edge is a thicker portion, and the portion between the medial edge and the inner edge is a recessed portion. The inner edge defines a bore. The base plate has inlet ports for receiving fuel and air and spark, where an ignition of the fuel and air by the spark creates a high pressure zone that drives the main rotor and the gear rotor rotationally within the stator ring, and an outlet port for exhausting spent fuel and air.

In various embodiments according to this aspect of the disclosure, aligning bores are disposed in the cover plate, stator ring, and base plate for receiving bolts therethrough and holding the ICE together. In some embodiments, the stator ring includes a main cog that forms a pressure seal between the stator ring and the main rotor. In some embodiments, the stator ring includes at least one secondary cog having a similar width to the main cog, but which does not form a pressure seal between the stator ring and the main rotor. In some embodiments, the gear rotor has a gap sized to receive the main cog and allow the gear rotor to rotate past the main cog. In some embodiments, a gap is disposed between the main rotor and the stator ring, the gap containing a high pressure zone in a clockwise portion from the main cog to the gear rotor, and the gap containing a low pressure zone in a counterclockwise portion from the main cog to the gear rotor.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein:

FIGS. 1A and 1B are a top plan view and a side cross-sectional view respectively of a cover plate for a rotary internal combustion engine according to an embodiment of the present disclosure.

FIGS. 2A and 2B are a top plan view and a side cross-sectional view respectively of a stator ring for a rotary internal combustion engine according to an embodiment of the present disclosure.

FIGS. 3A and 3B are a top plan view and a side cross-sectional view respectively of a main rotor for a rotary internal combustion engine according to an embodiment of the present disclosure.

FIGS. 5A and 5B are a top plan view and a side cross-sectional view respectively of a base plate for a rotary internal combustion engine according to an embodiment of the present disclosure.

DESCRIPTION

Figure 4A:
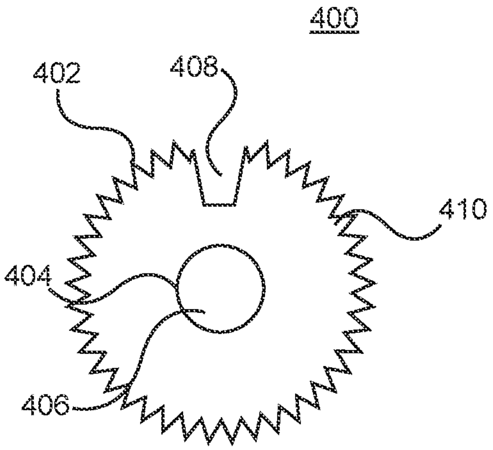
FIGS. 4A and 4B are a top plan view and a side cross-sectional view respectively of a gear rotor for a rotary internal combustion engine according to an embodiment of the present disclosure.

With reference now to the drawings, there are depicted all of the claimed elements of the various embodiments, although all claimed embodiments might not be depicted in a single drawing. Thus, it is appreciated that not all embodiments include all of the elements as depicted, and that some embodiments include different combinations of the depicted elements. It is further appreciated that the various elements can all have many different configurations, and are not limited to just the configuration of a given element as depicted. As indicated above, the elements of the drawings as depicted are not to scale, even with respect one to another, and relative size or thickness of one element cannot be determined by the aspect ratios of that element or with reference to any dimension of another element.

With reference now to FIGS. 1A and 1B, there are depicted a top plan view and a side cross-sectional view respectively of a cover plate 100 for a rotary internal combustion engine (ICE) 600 according to an embodiment of the present disclosure. The cover plate 100 has an outer circumference and edge 102, a medial edge 106, and an inner edge 110. The portion between the outer edge 102 and the medial edge 106 is a thicker or raised portion, and the portion between the medial edge 106 and the inner edge 110 is a thinner or cavity portion 108. The inner edge 106 defines a bore 114, in which is disposed a bearing 112. Bores 104 are defined in the raised portion, for bolting the cover plate 100 to other pieces of the ICE 600.

With reference now to FIGS. 2A and 2B, there are depicted a top plan view and a side cross-sectional view respectively of a stator ring 200 for a rotary ICE 600 according to an embodiment of the present disclosure. The stator ring 200 has an outer circumference and edge 202 and an inner edge 206. The inner edge 206 defines a bore 210. Teeth 208 are formed along the inner edge 206, with a primary cog 212 disposed in a position along the inner edge 206. The primary cog 212 is larger than the teeth 208. Bores 204 are defined in the stator ring 200, for bolting the stator ring 200 to other pieces of the ICE 600.

With reference now to FIGS. 3A and 3B, there are depicted a top plan view and a side cross-sectional view respectively of a main rotor 300 for a rotary ICE 600 according to an embodiment of the present disclosure. The main rotor 300 has an outer edge and circumference 302 and an inner edge 312 that defines a bore 314. A medial edge 304 forms a partially-circular cut-out 306 in the main rotor 300, which cut-out 306 does not extend to either the top or bottom surface of the main rotor 300, but does extend outwards to the outer edge 302 of the main rotor 300. An edge 308 defines a bore 310 that extends completely through the main rotor 300, at a position that is radially-centered to the circumference of the edge 304 and the cut-out 306.

Figure 4B:
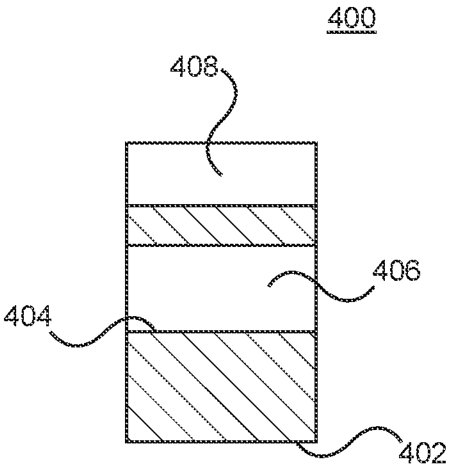

With reference now to FIGS. 4A and 4B, there are depicted a top plan view and a side cross-sectional view respectively of a gear rotor 400 for a rotary ICE 600 according to an embodiment of the present disclosure. The gear rotor 400 has an outer edge and circumference 402 and an inner edge 404. The inner edge 404 defines a bore 406. The outer edge 402 includes teeth 410 that are sized to engage the teeth 208 of the stator ring 200, and a primary cavity 408 that is sized to engage the primary cog 212 of the stator ring 200.

With reference now to FIGS. 5A and 5B, there are depicted a top plan view and a side cross-sectional view respectively of a base plate 500 for a rotary ICE 600 according to an embodiment of the present disclosure. The base plate 500 has an outer circumference and edge 502, a medial edge 504, and an inner edge 510. The portion between the outer edge 502 and the medial edge 504 is a thicker or raised portion, and the portion between the medial edge 504 and the inner edge 510 is a recessed portion 506. The inner edge 510 defines a bore 514, in which is disposed a bearing 512. Bores 508 are defined in the raised portion, for bolting the base plate 500 to other pieces of the ICE 600.

Disposed in the raised portion of the base plate 500, but proximate the medial edge 504, are a series of ports 516, 518, 520, and 522. The ports 516, 518, 520, and 522 are in fluid communication with other portions of the ICE 600, not depicted, but with functions as are commonly known and understood by persons of ordinary skill in the art, and as briefly described hereinafter. The ports 516, 518, and 520 are disposed proximate one another, and in a position that is generally clockwise, as depicted, from the port 522. In various embodiments, port 516 is an air inlet port to the ICE 600, port 518 is a fuel inlet port to the ICE 600, such as for gasoline, and port 520 is a spark inlet port, such as from a spark plug that is fitted into the port 520.

Port 522 is disposed in a position that is generally separated from and counter-clockwise to, as depicted, the ports 516, 518, and 520. In various embodiments, port 522 is an exhaust outlet port from the ICE 600 for combusted gases.

Figure 6A:
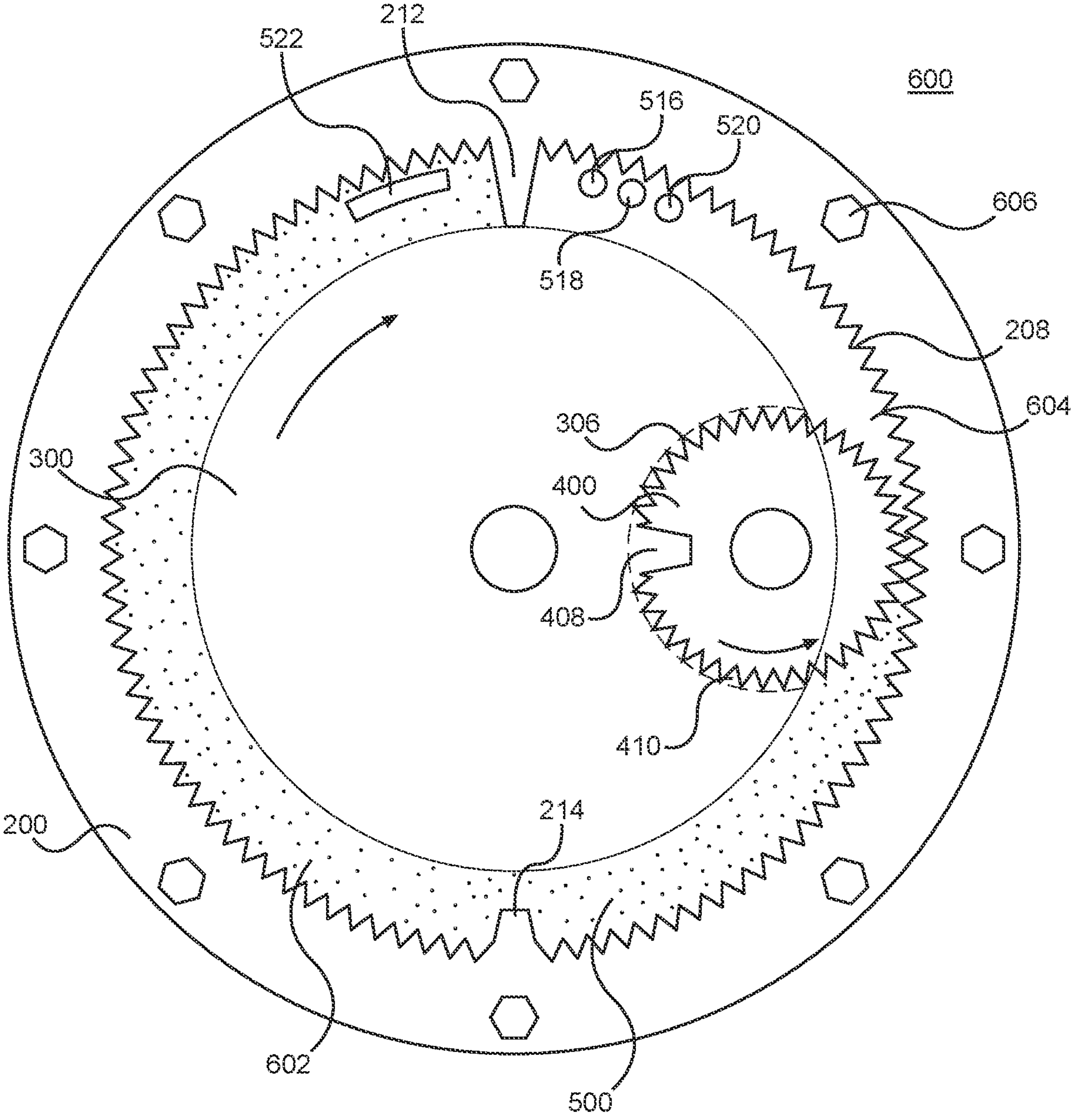
FIGS. 6A and 6B are a top plan view and a side cross-sectional view respectively of a partially-assembled rotary internal combustion engine according to an embodiment of the present disclosure.
Figure 6B:
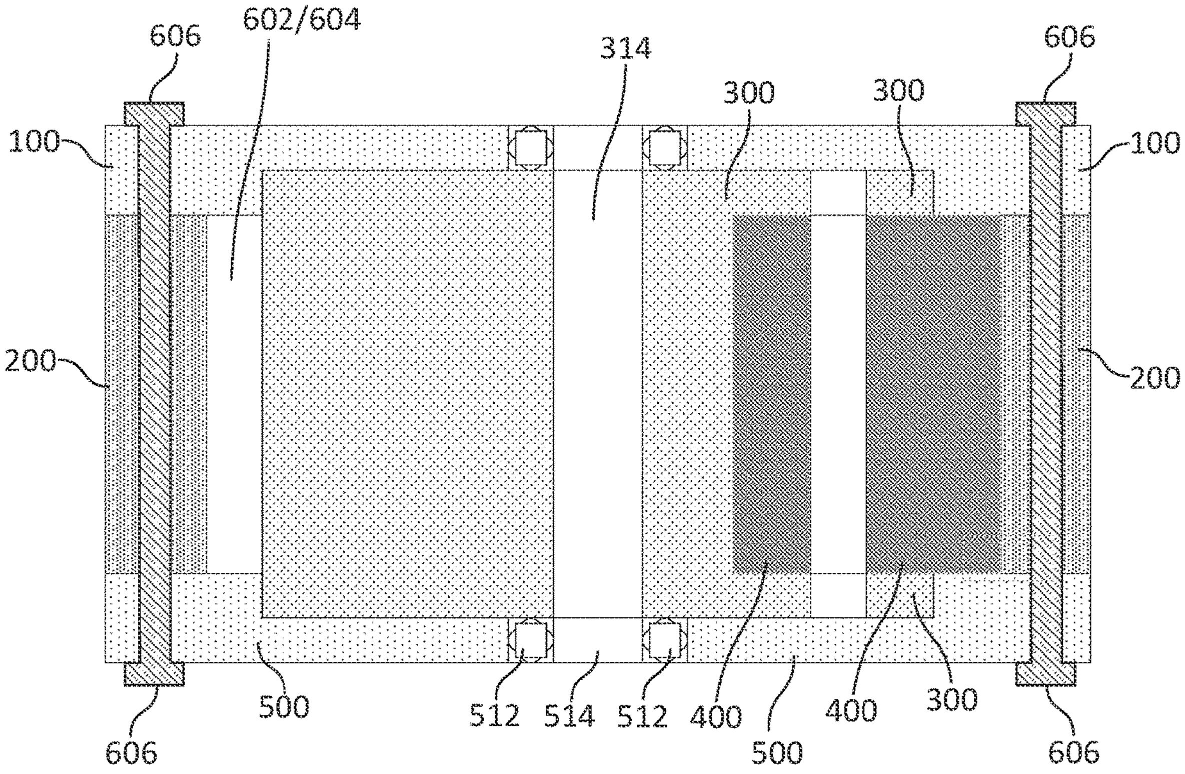

With reference now to FIGS. 6A and 6B, there are depicted a top plan view and a side cross-sectional view respectively of a partially-assembled rotary internal combustion engine 600 according to an embodiment of the present disclosure. As depicted, the base plate 500 is on the bottom of the assembly of the ICE 600, with the stator ring 200 disposed on top of the base plate 500. The main rotor 300 is disposed within the recessed portion 506 of the base plate 500. The bore 314 of the main rotor 300 and the bore 514 of the base plate 500 are aligned. A shaft of some type keeps the bore 314 of the main rotor 300 and the bore 514 of the base plate 500 aligned.

The gear rotor 400 is disposed within the cut-out 306 of the main rotor 300, with the bore 310 of the main rotor 300 and the bore 406 of the gear rotor 400 aligned. A shaft of some type keeps the bore 310 of the main rotor 300 and the bore 406 of the gear rotor 400 aligned in a manner where the main rotor 300 and the gear rotor 400 are allowed to rotate in differing ways, one from another.

As depicted in FIGS. 6A and 6B, the outer edge 302 of the main rotor 300 has a smaller diameter than and is nested interior to the medial edge 504 of the base plate 500, forming a gap 602/604 between the outer edge 302 of the main rotor 300 and the inner edge 206 of the stator ring 200. The gear rotor 400 extends into the gap 602/604, and the teeth 410 of the gear rotor 400 engage with the teeth 208 of the stator ring 200, forming a substantially pressure-tight seal between the engaged surfaces. The primary cog 212 of the stator ring 200 extends into the gap 602/604, with the innermost surface of the primary cog 212 forming a substantially pressure-tight seal between the primary cog 212 and the outer edge 302 of the main rotor 300.

Not depicted is the cover plate 100, which is disposed on top of the assembly as depicted in FIGS. 6A and 6B. The entire assembly is bolted together in a manner such that it is pressure-tight, such as with bolts 606.

The ICE 600 operates by introducing compressed air through the port 516 and fuel through the port 518 into the gap 602 at a time when the gear rotor 400 is disposed clockwise from the ports 516, 518, and 520. At an appropriate time, a spark is introduced through the port 520 and into the air/fuel mixture in the gap 604, causing the air/fuel mixture to detonate and expand into a pressurized zone 604 of the gap 602/604. The gap 602 on the other side of the gear rotor 400 is a low-pressure zone 602. The pressurized zone 604 pushes the main rotor 300 in a clockwise direction relative to the stator ring 200 (with the gear rotor 400 rotating counterclockwise around the bore 406). Because the primary cog 212 creates a pressure seal against the main rotor 300, the pressurized zone 604 cannot leak counter-clockwise past the primary cog 212 and into the low pressure zone 602.

The rotation of the gear rotor 400 relative to the stator ring 200 causes the main rotor 300 to rotate clockwise. A shaft (not depicted) connected to the main rotor 300, such as at the bore 312 of the main rotor 300, provides motive rotational power from the ICE 600.

As the gear rotor 400 rotates around the stator ring 200, it eventually passes by the exhaust port 522, where the expanded gases of the pressurized zone 604 are exhausted from the gap 602. As the gear rotor 400 passes the twelve-o'clock position on the stator ring 200 (in the embodiment as depicted), the primary cavity 408 of the gear rotor 400 engages the primary cog 212 of the stator ring 200, allowing the gear rotor 400 to travel past that position on the stator ring 200, all while maintaining the pressure seal. Depending upon the relative number of teeth and circumference on the gear rotor 400 and the stator ring 200, one or more secondary cogs 214 are placed around the inner circumference of the stator ring 200, so the high pressure zone 604 does not depressurize when the primary cavity 408 of the gear rotor 400 engages the stator ring 200. The process of introducing air, fuel, and spark through the ports 516, 518, and 520 then begins a new cycle of the ICE 600.

As used herein, the phrase "at least one of A, B, and C" means all possible combinations of none or multiple instances of each of A, B, and C, but at least one A, or one B, or one C. For example, and without limitation: Ax1, Ax2+Bx1, Cx2, Ax1+Bx1+Cx1, Ax7+Bx12+Cx113. It does not mean Ax0+Bx0+Cx0.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

LIST OF REFERENCE NUMBERS

- Cover Plate 100
  - Outer Circumference And Edge 102
  - Bores 104
  - Medial Edge 106
  - Cavity Portion 108
  - Inner Edge 110
  - Bearing 112
  - Bore 114
- Stator Ring 200
  - Outer Circumference And Edge 202
  - Bores 204
  - Inner Edge 206
  - Teeth 208
  - Bore 210
  - Primary Cog 212
  - Secondary Cog 214
- Main Rotor 300
  - Outer Edge And Circumference 302
  - Medial Edge 304
  - Partially-Circular Cut-Out 306
  - Edge 308
  - Bore 310
  - Inner Edge 312
  - Bore 314
- Gear Rotor 400
  - Outer Edge And Circumference 402
  - Inner Edge 404
  - Bore 406
  - Primary Cavity 408
- Base Plate 500
  - Outer Circumference And Edge 502
  - Medial Edge 504
  - Recessed Portion 506
  - Bores 508
  - Inner Edge 510
  - Bearing 512
  - Bore 514
  - Ports 516, 518, 520, And 522
- Rotary Internal Combustion Engine (ICE) 600
  - Gap 602
  - Pressurized Zone 604
  - Bolts 606

The invention claimed is:

1. A rotary internal combustion engine (ICE) comprising:

a cover plate having an outer edge, a medial edge, and an inner edge, where a portion between the outer edge and the medial edge is a relatively thicker portion, and a portion between the medial edge and the inner edge is a relatively thinner portion, and the inner edge defines a bore through the cover plate, a stator ring having an outer edge and an inner edge, where the inner edge defines a bore, teeth are formed along the inner edge, with a primary cog disposed in a position along the inner edge, where the primary cog is larger than the teeth, a main rotor having an outer edge, an inner edge that defines a bore, and a medial edge that forms a partially-circular cut-out in the main rotor, which cut-out does not extend to either a top or bottom surface of the main rotor, but does extend outwards to the outer edge of the main rotor, a gear rotor disposed within the partially-circular cut-out in the main rotor, and having an outer edge, and an inner edge that defines a bore, the outer edge includes teeth that are sized to engage the teeth of the stator ring, and a base plate having an outer edge, a medial edge, and an inner edge, a portion between the outer edge and the medial edge is a relatively thicker portion, and a portion between the medial edge and the inner edge is a relatively thinner portion, the inner edge defines a bore, wherein the base plate has inlet ports for receiving fuel and air and spark, where an ignition of the fuel and air by the spark creates a high pressure zone that drives the main rotor and the gear rotor rotationally within the stator ring, and an outlet port for exhausting spent fuel and air.

2. The ICE of claim 1, further comprising aligning bores in the cover plate, stator ring, and base plate for receiving bolts therethrough and holding the ICE together.

3. The ICE of claim 1, wherein the stator ring includes a main cog that forms a pressure seal between the stator ring and the main rotor.

4. The ICE of claim 1, wherein the stator ring includes at least one secondary cog having a similar width to the main cog, but which does not form a pressure seal between the stator ring and the main rotor.

5. The ICE of claim 1, wherein the gear rotor has a gap sized to receive the main cog and allow the gear rotor to rotate past the main cog.

6. The ICE of claim 1, wherein a gap is disposed between the main rotor and the stator ring, the gap containing a high pressure zone in a clockwise portion from the main cog to the gear rotor, and the gap containing a low pressure zone in a counterclockwise portion from the main cog to the gear rotor.

* * * * *